United States Patent [19]

Henderson

[11] 4,026,670
[45] May 31, 1977

[54] APPARATUS FOR PRODUCING CARBON BLACK

[75] Inventor: E. Webb Henderson, Oregon, Ohio

[73] Assignee: Phillips Petroleum Company, Bartlesville, Okla.

[22] Filed: Apr. 19, 1976

[21] Appl. No.: 678,099

[52] U.S. Cl. .............................. 23/259.5; 423/450
[51] Int. Cl.$^2$ ......................................... C09C 1/48
[58] Field of Search .......... 23/259.5; 423/450, 455, 423/456, 457, 458; 431/182, 183, 184; 239/404, 405

[56] References Cited

UNITED STATES PATENTS

| | | | |
|---|---|---|---|
| 2,647,568 | 8/1953 | Sloan | 431/183 |
| 3,079,236 | 2/1963 | Heller et al. | 23/259.5 X |
| 3,087,796 | 4/1963 | Latham, Jr. et al. | 23/259.5 |
| 3,244,220 | 4/1966 | Kloecker | 431/184 X |
| 3,256,066 | 6/1966 | Higgins | 23/259.5 |
| 3,299,841 | 1/1967 | Hemker et al. | 431/183 X |

Primary Examiner—Morris O. Wolk
Assistant Examiner—Roger F. Phillips

[57] ABSTRACT

An apparatus for producing carbon black is comprised of an elongate outer housing having mounted therein a tubular member having a flow passage therethrough which forms a reaction zone of the apparatus. At the upstream end of the reaction zone, a perforate cage is provided which has a plurality of perforations through which air enters the interior of the cage to form a vortex flow path. The side wall of the cage is spaced from the interior surface of the housing providing an air flow path therebetween. The upstream end of the cage is a wall and has a centrally located opening therethrough which has an annular ring projecting therefrom to form a seal with another annular ridge which is in sliding and sealing engagement therewith. The seal prevents entry of air through the opening from the annular flow path to the interior of the cage. Coaxial tubes extend through the opening and into the cage and are operable to introduce fuel and make oil therethrough.

8 Claims, 1 Drawing Figure

U.S. Patent     May 31, 1977     4,026,670
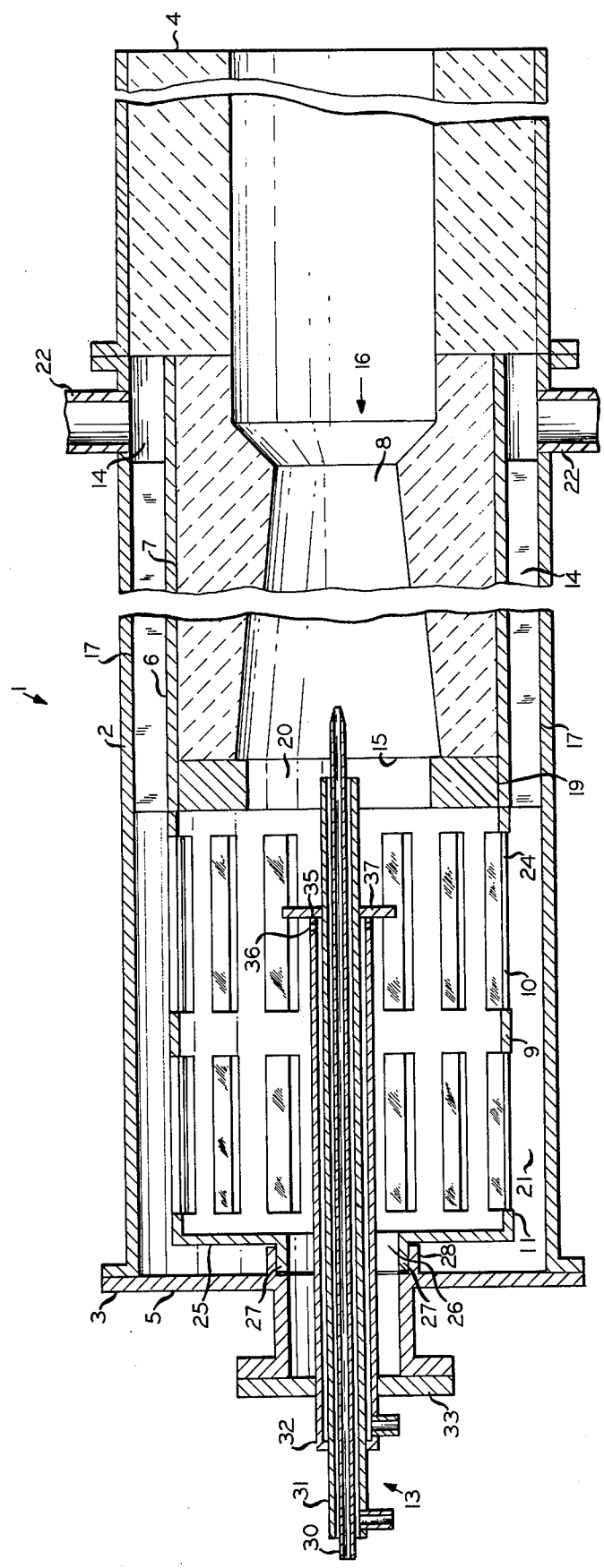

APPARATUS FOR PRODUCING CARBON BLACK

The present invention relates to an improved apparatus for producing carbon black. One of the problems with presently used carbon black reactors is the temperature of the housing which can be as high as 1300° F or even higher. One method of reducing this temperature was to provide a flow path for air between the interior surfaces of the housing and various portions of the internal component parts of the reactor whereby the air formed an insulating space and also the air was heated by flowing along the path and thereby reduced the heat available to heat the housing. Although such an arrangement has been effective to reduce the housing temperature, the temperature has still been excessively high. It has been found that by preventing entry of air through an opening through which the oil and fuel introduction tubes extend into the cage, that the temperature of the housing can be reduced further to a more acceptable level. Such a reduction in temperature prevents heat loss to the atmosphere, makes the working area safer and more comfortable and reduces problems normally associated with excessively high temperatures.

The principal objects and advantages of the present invention are: to provide an apparatus for producing carbon black in which the housing adjacent to the upstream end thereof operates at a lower temperature than was previously obtained; to provide such an apparatus which will allow for proper support of various portions of the interior components of the apparatus while still allowing expansion differentials between the various portions when subjected to elevated temperatures; and to provide such an apparatus which is well adapted for its intended use, easy to maintain and simple in construction.

Other objects and advantages of the present invention will become apparent from the following detailed description taken in connection with the accompanying drawings wherein are set forth by way of illustration and example certain embodiments of the present invention.

FIG. 1 is a fragmentary sectional view of an apparatus for producing carbon black.

Referring more in detail to the drawing:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally an apparatus for producing carbon black which includes an elongate housing 2 which has opposite ends 3 and 4 with the end 3 preferably being closed by a wall 5 and the end 4 preferably being open. This outlet end of the reaction zone is where quench is added and the cooled smoke is sent then to filtration. The housing 2 is preferably made of a metal such as carbon steel, and has a generally round cross section. The apparatus 1 also includes a tubular member 7, preferably ceramic, which forms a reaction zone 8 and is suitably mounted within the interior of the housing 2. Positioned between the tubular member 7 and the wall 5, is a perforate cage 9 which has a plurality of apertures 10 through a side wall 11 thereof for a purpose to be later described. The apparatus 1 also includes injection means 13 which is operable to introduce various fluids into the interior of the apparatus 1 as will be more fully described below.

The tubular member 7 is suitably mounted within the interior of the housing 2 as is well known in the art and preferably at least an upstream end portion of a tubular member 6, which preferably is carbon steel and surrounds the tubular member 7, is spaced from the interior surface of the housing 2 forming an annular flow path 14 therebetween. The reaction zone 8 is shown as a venturi shaped passage encased in the tubular member 6 and extends from an upstream end 15 to a downstream end 16 from which effluent is discharged. It may be desirable in certain structures to provide vanes 17 positioned in the flow path 14 between the interior surface of the housing 2 and the exterior surface of the tubular member 6. The use of vanes not only provides support for the upstream end of the tubular members 6 and 7 but also provides a means to direct the air flowing through the flow path 14 such as starting same to flow in a vortex path. The tubular member 7 can be made of any suitable refractory material which will withstand the operating temperatures of the apparatus 1. The tubular member 6 encasing the venturi section is made of carbon steel.

It is desired to provide the apparatus 1 with a choke ring 19 which, as shown, is mounted in tubular member 6 adjacent the upstream end 15 of venturi and has a through opening 20 which would have a diameter less than the diameter of the upstream end of the venturi inlet to reaction zone 8. It is to be understood though that the use of the choke ring is not necessary in the practice of the present invention.

The cage 9, as shown, is positioned between the upstream end 15 and the end wall 5 and is suitably supported in the interior of the housing 2. The side wall 11 of the cage is spaced from the interior surface of the housing 2 defining an air flow path 21 therebetween which is in communication with the flow path 14 whereby air introduced into the apparatus 1 through an inlet 22 can flow therefrom to the interior of the cage 9. The inlet 22 as shown is positioned between the upstream end 15 and the downstream end 16 of the venturi. The cage 9 and tubular members 6 and 7 are in axial alignment with the interior diameter of the cage 9 being larger than the diameter of the upstream end 15 and the diameter of the opening 20. As shown, the cage 9 has a plurality of apertures 10 providing communication between the flow path 21 and the interior of the cage. Preferably, deflectors 24 are positioned adjacent to at least a portion of the apertures 10 and preferably adjacent to each one, with the baffles being positioned so as to deflect the air flowing through the apertures 10 in a direction to provide vortex flow of the air within the interior of the cage 9. The cage 9 has an end wall 25 positioned adjacent the end wall 5 and is preferably spaced therefrom. The end wall 25 has an opening 26 and seal means are provided which cooperate with the end wall 25 to form a seal for the opening 26 to prevent flow of air therethrough from the flow path 21 into the interior of the cage 9.

It has been found that by preventing flow of air through the opening 26 that the exterior temperature of the housing 2 adjacent the upstream end thereof can be reduced from an operating temperature of 1300° F to a temperature of between 600° F and 800° F. The seal means can be of any suitable type and preferably will allow relative axial movement between portions of the apparatus 1. The relative axial movement helps prevent strain-free operation of the apparatus 1 in that various portions of the apparatus 1, because same are made from different materials, will expand at different rates thereby requiring some degree of movement freedom to prevent strain. In the illustrated structure the seal means includes an annular ridge 27 surrounding the opening 26 wherein the annular ridge 27 projects outwardly from the end wall 25 toward the wall 5. To complete the seal, the wall 5 also has an annular ridge 28 projecting therefrom with the annular ridge 28 extending toward the wall 25. The annular ridges 27 and 28 are sleeved together in a slip fit to provide relative movement therebetween and still provide a substantially tight seal to prevent air from flowing through the opening 26. As shown, the annular ridge 27 is sleeved within the annular ridge 28. It is to be noted that the ridge 27 could also be supported by portions of the injection means 13 and slidably supported thereon and also provide the same seal for the opening 26. However, it is desired that the opening 26 be of a larger diameter than portions of the injection means 13 as described below.

The injection means 13 is comprised of coaxial tubes 30, 31 and 32 which are suitably carried by the apparatus 1 such as by a support member 33 which is secured to the end wall 5. The tubes 30, 31 and 32 are moveable axially relative to one another as is well known in the art. The tube 30 is adapted for introducing make oil into the apparatus 1, the tube 31 is for introducing jacket air into the apparatus 1 and the tube 32 is for introducing fuel into the apparatus 1. As shown, the outer tube 32 has a free end 35 and a plurality of apertures 36 are through the wall of the tube 32 adjacent the end 35 and are directed generally radially. A radially extending flange or flame holder 37 is secured to the end 35 of the tube 32 and preferably has a diameter smaller than the diameter of the opening 26 so that the means 13 can be removed from the apparatus 1 without necessitating complete disassembly of the apparatus 1.

To illustrate the operation of the present invention, the following data are provided. The first column of data denoted "Without Invention" is for an apparatus similar to that shown in FIG. 1 with the exception of no seal means are present to seal the opening 26 from entry of air therethrough from the flow path 21. It can be seen that the temperature of the housing 2 was approximately 1300° F. By operating the same apparatus, with the exception of providing a seal for the opening 26 as in the illustrated structure, column 2 shows that the temperature of the housing 2 is 800° F.

| | I Without Invention | With Invention |
|---|---|---|
| Oil, gph (15° Spray Angle)[1] | 242 | 226 |
| Oil temperature, °F | 550 | 550 |
| Oil pressure, psig | 150 | 120 |
| Tangential air, SCF/hr | 137,500 | 137,500 |
| Air temperature, °F | 700 (est) | 670 |
| Natural gas, SCF/hr | 9,200 | 9,340 |
| Burner Flame HOlder 37 spacing upstream from the inlet, inches | 8 | 8 |
| Axial air, SCF/hr[2] | 4,090 | 3,930 |
| Air/fuel Volume Ratio | 15.3 | 15.1 |
| Air/oil, SCF/gal | 581 | 627 |
| Quench locus, ft[3] | 12 3/4 | 9 1/6 |

-continued

| | I Without Invention | With Invention |
|---|---|---|
| Yield, No. CB/gallon of feed | 4.20 | 4.03 |
| Photoelometer (Chloroform), % | 73 | 60 |
| Iodine No., m²/gm | 78.4 | 86.1 |
| CTAB, m²/gm | 89.6 | 97.4 |
| N₂SA, m²/gm | 91.3 | 102.7 |
| Tint | 104.2 | 111.7 |
| 24M4 DBP, cc/100 gm | 98.3 | 104.4 |
| Calculated Tint | 103.2 | 105.8 |
| Tint Residue | +1.0 | +5.9 |
| Shell Temperature, °F[4] | 1300 | 800 |

[1]The oil nozzle for runs I and II, respectively, was 14 inches and 13 inches downstream from the Venturi inlet.
[2]Axial air tube outlet 31 for runs I and II, respectively, was 8 inches and 18 inches downstream from the flame holder 37.
[3]Quench locus, reactor length, is downstream from Venturi inlet.
[4]Measured or observed on outside of metal reactor shell at upstream end of reactor near burner edge upstream end.

The apparatus used to obtain the above data had the following dimensions:

| | |
|---|---|
| Shell diameter, inches, | 20 |
| Burner cage: | |
| Diameter, inches, | 14 |
| Length, inches, | 20 |
| Louver size: | |
| Length, inches, | 8 |
| Width, inches, | 2 |
| Venturi: | |
| Inlet diameter, w/o choke, inches, | 10 |
| Choke opening diameter, inches, | 8 |
| Choke length, inches, | 3 |
| Venturi throat diameter, inches, | 6 |
| Length from Venturi inlet to throat, inches | 48 |
| Burner case upstream end: | |
| Open area, in², | |
| Prior operation, | 64 |
| Invention, | 0 |

It is to be understood that while I have illustrated and described certain forms of my invention, it is to be understood that same is not to be limited to the specific form or arrangement of parts herein described and shown.

What is claimed and desired to be secured by Letters Patent is:

1. An apparatus for producing carbon black, said apparatus including:
   a. an elongate housing having first and second ends and a side wall between said ends and having an end wall member substantially closing said first end;
   b. a first member positioned in said housing having an upstream end spaced from said first end at a position downstream of said housing end wall, said first member having a longitudinal flow passage therethrough extending from said upstream end to a downstream end and with said flow passage forming a reaction zone;
   c. injection means extending into said housing from said first end and being in general axial alignment with said flow passage, said injection means being operable for introducing fluid into said housing;
   d. a cage mounted in said housing between said first end and said upstream end and having a side wall with a plurality of through perforations with the cage side wall being spaced from the side wall of said housing defining a first flow path therebetween with said first flow path communicating with a chamber defined by said cage through said perforations for flow of air from the first flow path into the chamber, said chamber being in communication with said flow passage, said cage having an end wall spaced from the housing first end defining an air space therebetween and closing the end thereof adjacent the housing first end from flow of air from the first flow path into the chamber except through the perforations, said cage end wall having a through opening receiving the injection means therethrough; and wherein the improvement comprises e. seal means cooperating with said cage end wall sealing said opening from flow of air therethrough from the first flow path.

2. The apparatus as set forth in claim 1 wherein:

a. said seal means including a first seal portion carried by said cage end wall adjacent said opening, said first seal portion being in axial sliding and sealing engagement with a second seal portion carried by said housing.

3. The apparatus as set forth in claim 2 wherein:

a. said second seal portion being carried by a wall forming the first end of said housing.

4. The apparatus as set forth in claim 3 wherein:

a. said first seal portion is an annular member projecting from said end wall and said second seal portion is an annular member projecting from the first end wall, one of said annular members being slidably and sealingly sleeved within the other annular member.

5. The apparatus as set forth in claim 1 wherein:

a. said first member being spaced from said housing for at least a portion of the length thereof forming a second flow path communicating with said first flow path; and b. means forming an inlet opening into said second flow path positioned between said upstream end and said second end.

6. The apparatus as set forth in claim 5 wherein:

at least some of said perforations having a deflector adjacent thereto for deflecting air to flow in a vortex-forming direction into the interior of said cage.

7. The apparatus as set forth in claim 1 wherein said means including:

a. a plurality of coaxial tubes, one within the other, and axially moveable independently of one another, one of said tubes having a radially extending flange adjacent a free end thereof with said flange having a diameter smaller than the diameter of said opening.

8. An apparatus for producing carbon black, said apparatus including:

a. an elongate housing having upstream and downstream ends and a side wall between said ends and having an end wall closing said upstream end;

b. a first member positioned in said housing and extending longitudinally therealong, said first member having a downstream end and an upstream end spaced downstream from the housing upstream end wall, said first member having a longitudinal flow passage therethrough between the first member upstream and downstream ends with said flow passage forming a reaction zone;

c. injection means extending into said housing through said housing upstream end wall and adapted to introduce fluids into the housing, said injection means including a tubular member in general axial alignment with said flow passage with said tubular member being adapted to inject make-oil into the flow passage;

d. a cage mounted in said housing between said housing upstream end and said first member end, said cage having a side wall with a plurality of through perforations, said cage side wall being spaced from an interior surface of the housing side wall forming a flow path therebetween with said flow path communicating with a chamber defined by said cage through said perforations for flow of air from the flow path into the chamber, said chamber being in communication with said flow passage, said cage having an upstream end wall spaced from the housing upstream end wall defining an air space therebetween and said cage upstream end wall having a through opening receiving the injection means therethrough;

e. deflector means cooperating with certain of said perforations operable for deflecting air flowing into the perforations in a generally tangential manner to form a vortex flow within said chamber; and wherein the improvement comprises f. seal means cooperating with said cage upstream end wall and said housing upstream end wall sealing said opening from flow of air therethrough from the flow path, said seal means including a first seal portion carried by said cage upstream end wall in sliding and sealing engagement with a second seal portion carried by said housing upstream end wall.

* * * * *